INVENTORS
ROBERT SUHRMANN
GERHARD FÖRSTER
BY
Frank R. Jifani
AGENT

INVENTORS
ROBERT SUHRMANN
GERHARD FÖRSTER
BY
Frank R. Trifari
AGENT

July 31, 1962 R. SUHRMANN ET AL 3,047,656

TELEVISION BACKGROUND AND CONTRAST CONTROL

Filed Feb. 27, 1958 4 Sheets-Sheet 3

INVENTORS
ROBERT SUHRMANN
GERHARD FÖRSTER
BY
Frank R. Jifani
AGENT

INVENTORS
ROBERT SUHRMANN
GERHARD FÖRSTER
BY
[signature]
AGENT

United States Patent Office 3,047,656

Patented July 31, 1962

3,047,656

TELEVISION BACKGROUND AND CONTRAST CONTROL

Robert Suhrmann, Hamburg-Rahlstedt, and Gerhard Förster, Hamburg-Stellingen, Germany, assignors to North American Philips Company, Inc., New York, N.Y., a corporation of Delaware Filed Feb. 27, 1958, Ser. No. 718,039
Claims priority, application Germany Mar. 9, 1957
6 Claims. (Cl. 178—7.5)

It is known that the eye has a logarithmically varying sensitivity curve. Therefore, the impression of an equivalent brightness is gained, when the same ratio $k$ exists between brightness values $H_0$, $H_1$ and $H_2$, $H_3$:

$$\frac{H_o}{H_1}=\frac{H_2}{H_3}=\frac{H_{(x-1)}}{H_x}=k \qquad (1)$$

Such an intensity ratio between two brightness levels is termed: "level contrast." The lowest, still perceptible brightness ratio $k_0$ between adjacent levels depends upon the adaptation of the eye and on the brightness of the surroundings and lies between about 1.02 and 1.10, in many cases even higher. If a diagram of brightness values is made by means of strips of different brightnesses, of which adjacent strips have the same brightness $k$, a succession of brightness values is obtained, which varies approximately exponentially stepwise; this is termed the "gray scale," since the brightness values (gray values) increase or decrease stepwise from strip to strip. Thus the eye has the impression of a linear brightness ladder.

The ratio occurring within a transmitted range, for example within one image, between the peak brightness $H_n$, which corresponds to the transmitted "white values," and the minimum brightness (background brightness) $H_0$, which corresponds to the "black values" is termed the contrast (coarse contrast) K:

$$\frac{H_n}{H_o}=K \qquad (1b)$$

With such a gray scale the brightness $H_x$ of an arbitrary step $x$ is indicated mathematically by the formula:

$$H_{(x)}=H_o\left(\frac{H_n}{H_o}\right)^{\frac{x}{n}} \qquad (2)$$

wherein $n$ designates the number of steps at which the peak brightness $H_n$ is attained. It is evident that $H_0$ and $H_n$ are the limit values of $H_x$ at $x=0$ and $x=n$.

In the diagram shown in FIG. 1, wherein the brightness values H are plotted logarithmically on the ordinate, a straight-line characteristic curve and a scale corresponding to the visual gray steps $x$ on the abscissa are obtained, if the abscissa is divided linearly. In the same diagram also the control-voltage $U_s$ required to obtain the brightness H of the reproducing device can be indicated. Between the control-voltage $U_s$ of an electro-optical reproducing device and the brightness value H (luminous density) there is, as a rule, the relationship:

$$H=BU_s^{\gamma} \qquad (3)$$

$\gamma$ designates a constant gradation exponent. In the said diagram this exponent occurs in the slope of the usually straight-line characteristic curve.

Between the brightness values, scanned for example by an optico-electrical pick-up device, and the signal voltage U thus obtained there is, as a rule, such a relationship that under certain conditions the signal voltage, subsequent to transmission, can be directly supplied to the reproducing device; such conditions prevail, for example, when using given types of preamplifiers and electro-optical converters. The signal voltage U then has, in the diagram, the same characteristic curve as the control-voltage $U_s$. As far as deviations from the desired exponential characteristic curve occur, they are manifest in a larger or smaller curvature of the voltage characteristic in the diagram.

The adaptation of the signal voltage U to the reproducing device in a manner such that the gradation exponent (linear gamma correction) or the shape of the characteristic curve is modified (non-linear gamma correction) does not give rise to difficulties and may be carried out, (if desired by control) at any spot on the transmission path between an optico-electrical pick-up device and the reproducing device.

Consequently, from the diagram shown is evident the relationship between the control-voltage $U_s$ and the brightness H; on the abscissa is then plotted the number of gray steps used as an auxiliary variable.

Usually, the signal voltage U, which is generally used directly as the control-voltage $U_s$ as stated above, is caused to attain such a characteristic curve that at a given ambient brightness $H_{ro}$ an exponential brightness characteristic with a fixed background brightness $H_o$ and a given peak brightness $H_n$ is obtained. If, when considering this relationship, the Formula 3 is introduced into the Formula 2, the variation of the control-voltage $U_s$ and hence also that of the signal voltage U with the auxiliary variable $x$ is obtained:

$$U_{s(x)}=U_{(x)}=U_o\left(\frac{U_n}{U_o}\right)^{\frac{x}{n}} \qquad (4)$$

wherein $U_o$ and $U_n$ designate the values required for the background brightness $H_o$ and the peak brightness $H_n$. The gradation exponent $\gamma$ does not occur in this formula.

As a fixed ambient brightness preferably the value $H_{ro}=0$ is assumed, i.e. a dark room, since in this case a maximum contrast can be obtained.

The maximum contrast could be obtained, if the minimum brightness $H_o$, which corresponds to the black value, could be chosen to be equal to zero or to be slightly below the sensitivity limit of the eye. However, thus the purpose is not attained, since on the one hand the sensitivity limit of the eye varies strongly in accordance with the adaptation condition and on the other hand stray light from the bright parts, for example by reflection from the ambience or by reflection inside a cathode-ray tube, strikes the dark picture parts, so that the latter may be more or less predominated in the case of too low an individual brightness.

The minimum brightness $H_o$ corresponding to the black value must therefore, in accordance with the sensitivity limit of the eye, be chosen to be higher than the brightness of the stray light $H_{oo}$, for example, to be 3 asb., in a dark room without light from other sources. Since a satisfactory image transmission is possible, when the contrast is about 100 or more, it is advantageous to choose the control to be such that the peak brightness is about 300 asb.; this may be readily attained for example with cathode-ray tubes used in television receivers.

In order that the invention may be readily carried into effect, it will now be described in detail, by way of example, with reference to the accompanying drawing, in which.

Figure 1:
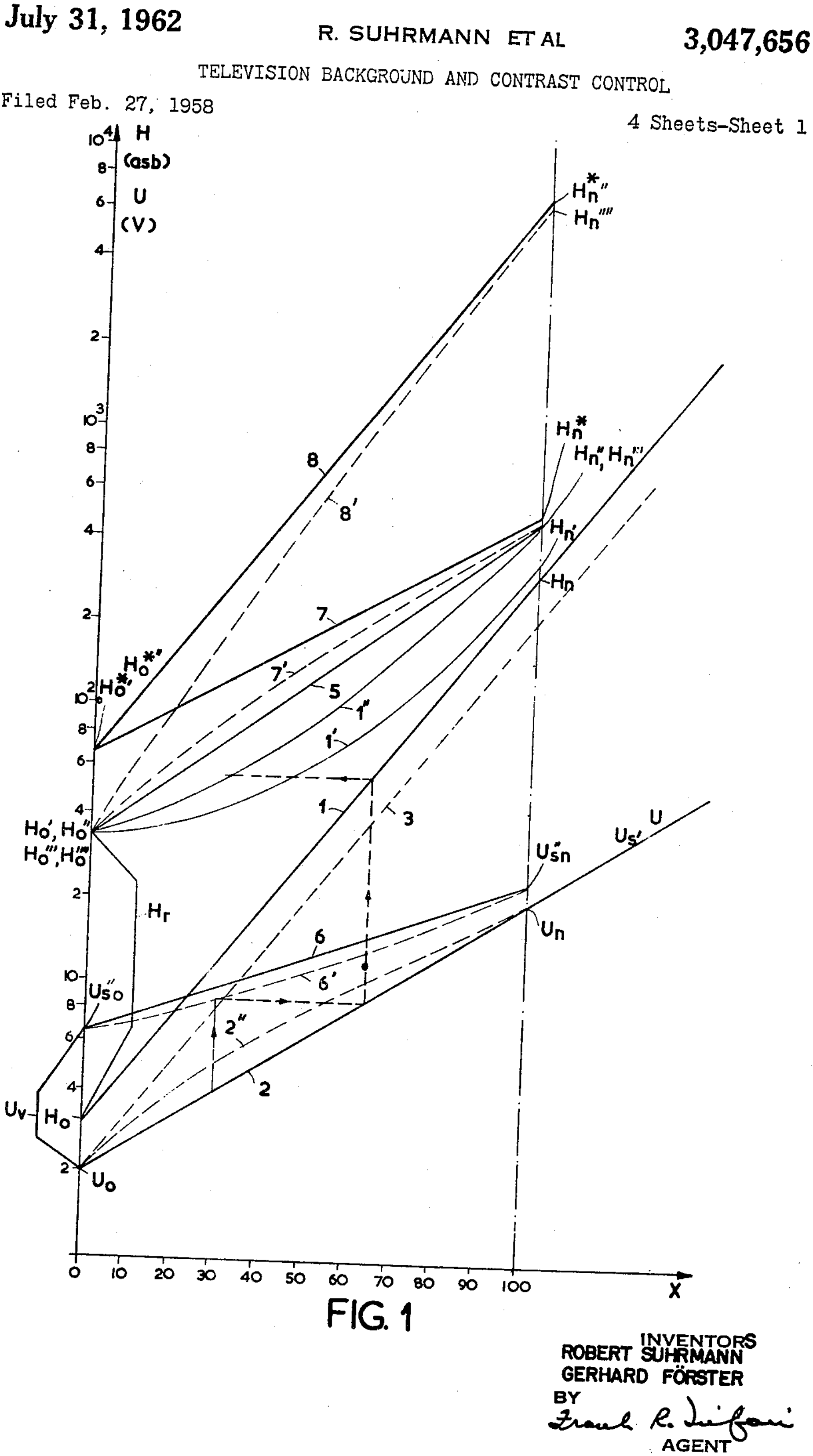
FIG. 1 is a semi-logarithmic diagram in which the brightness H and the signal control voltage U are plotted against the so-called gray steps.

FIG. 1 shows a semi-logarithmical diagram of the aforesaid kind. Curve 1 indicates the variation of the brightness between 3 asb. and 300 asb. In the Formula 2

$$H_o=3 \text{ and } H_n=300 \tag{5}$$

On the abscissa is, on an arbitrary scale, plotted the magnitude *x*, which varies between 0 and 100 in the control-range. The assumed maximum number of steps is therefore $n=100$. Curve 2 illustrates the associated control-voltage $U_s$ which varies between $U_o=2$ v. and $U_n=20$ v. Between the curves 1 and 2 prevails the relationship according to Formula 3. In this case $\gamma$ is assumed to be equal to 2, as is usually the case with cathode-ray tubes.

At a different gamma value, the slope of the curve $U_s$ varies; at $\gamma=1$ the curve 3, shown in broken lines, may be obtained, for example, wherein $U_o=2$ v. and $U_n=200$ v.; the curves 1 and 3 are parallel.

Figure 2:
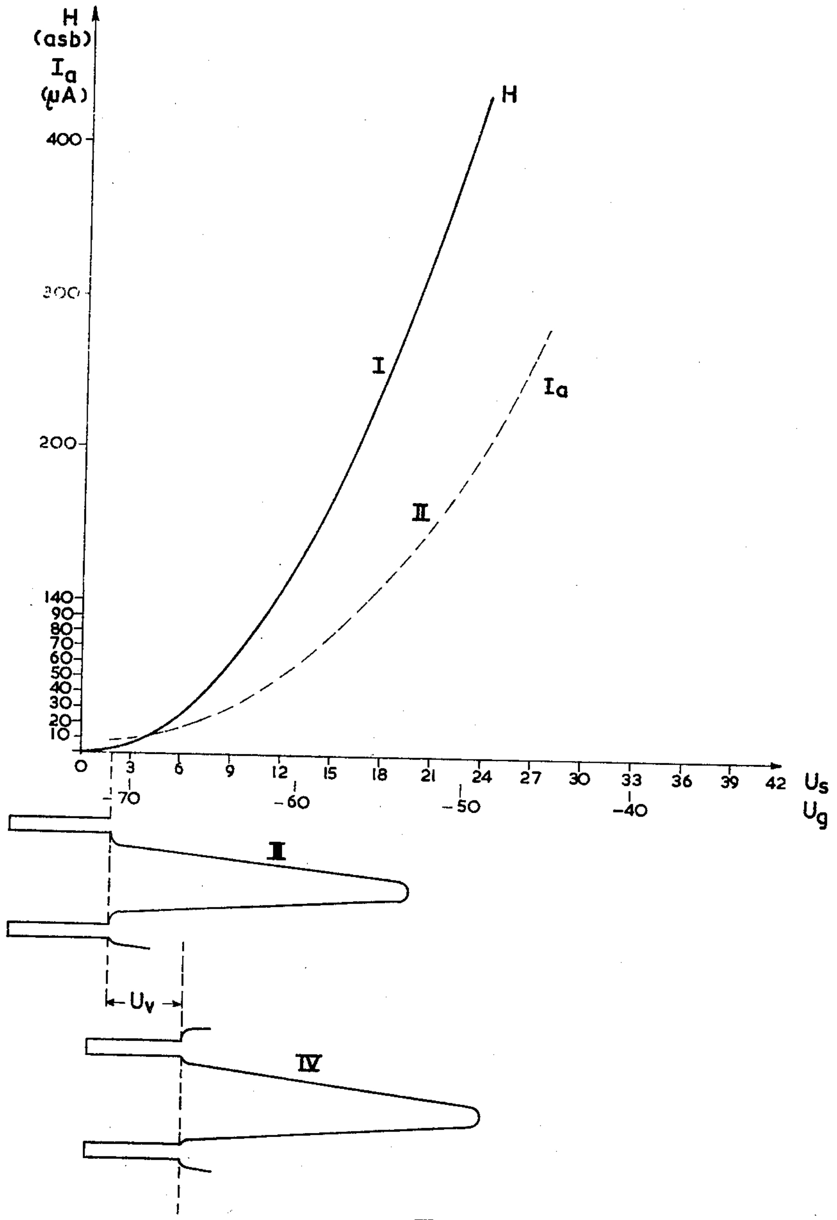
FIG. 2 illustrates characteristic curves of a reproducing device.

FIG. 2 shows, in accordance with Formula 3, the brightness curve I of a television picture tube in accordance with the control-voltage $U_s$.

The value $U_s=2$ v. and corresponds to a background brightness $H_n$ of 3 asb. and hence to a black value of the video voltage lying below the abscissa. The white value is equal to $U_s=20$ v. and thus produces a peak brightness $H_n=300$ asb. In the curve II the anode current of the tube is given as a function of the bias voltage $U_g$ between the control-electrode, for example between cathode and first grid of a cathode-ray tube. It is evident therefrom that in this case the reference value $U_s=0$ of the control-voltage lies at a bias voltage of about −71 v. and that the background brightness of about 3 asb. requires a minimum control-voltage $U_{s_0}$ of 2 v.

At III is indicated a television signal which controls the characteristic curve up to $U_{sn}=20$ v. from the working point $U_{s0}=2$ v. If the shifting voltage $U_v=4.5$ v., the working point for the background brightness shifts to $U''_{s0}=6.5$ v. and the signal voltage U controls up to a value $U''_{sn}=24.5$ v., as is indicated by curve IV.

From the diagram shown in FIG. 1 it is evident that no linear brightness characteristic curve is obtained in the event of an ambience which is not dark. Otherwise the screen which usually does not absorb the alien light and which is therefore not black, reflects part of the light $H_r$ of the incident ambient light, which part contributes, in the eye of the spectator, to the brightness H produced by the reproducing device proper. Thus the curve I changes into a curve 1′ ($H_r=30$ asb), to which applies:

$$H'=H+H_r \tag{6}$$

The new value of the background brightness:

$$H'_o=H_o+H_r \tag{7}$$

has increased considerably. With low brightness a particular contrast value (relative brightness difference *k*) is obtained only at a higher variation in the signal voltage U, so that a few of the brightness steps transmitted by small voltages are no longer visible and get therefore lost for the reproduction. Owing to the logarithmical sensitivity of the eye the variation in peak brightness also occurring from $H_n$ into $H'_n=H_n+H_r$ is unimportant, since with respect to $H_n$ the value $H_r$ is comparatively low.

A deviation from the aforesaid brightness division may also occur when the spectator, for some subjective reason, for example his eyes not yet being adapted to darkness, adjusts himself, even in the dark surroundings, to a different background brightness $H''_o$ than that required for correct observation.

Such a variation in background brightness usually occurse when to the control-voltage $U_s$ or to the signal voltage U a constant shifting voltage $U_v$ is added, so that the working point of the reproducing device is shifted to higher brightness values. This become manifest in the diagram of FIG. 1 in that, whilst the relationship between the brightness H″ and the control-voltage $U_s$ remains unchanged, not only the signal voltage U but also a shifting voltage $U_v$ are operative as a control-voltage $U''_s$:

$$U''_s=U+U_v \tag{8}$$

Instead of the Formula 3, H″ is equal to:

$$H''=B(U+U_v)^\gamma \tag{9}$$

The brightness curve 1″ thus changed starts again at a value in the diagram which is higher relative to $H_o$, the starting point of curve 1. For comparison the shifting voltage $U_v$ is chosen to be about 4.5 v., so that $H''_o=H'_o$, which means that a brightness increased by 30 asb. is obtained (equal to the increase by $H_r$).

The curve 1″ may be simply drawn by plotting, at a given step *x* (for example $x=30$) on the curve 2 (or 3) on the ordinate the associated signal voltage U, by adding $U_v$ thereto, then by calculating, at curve 2 (or 3) with this higher control-voltage value in the curve 1, the associated brightness value and by indicating this brightness over the chosen step *x* (cf. the arrow indicated in broken lines).

As with the curve 1′, gradation deformations occur with curve 1″ though they are slightly smaller, but yet perceptible, particularly in the event of low brightness values, so that especially in the dark picture portions a materially worse reproduction is obtained.

These disadvantages are avoided in an arrangement for the control of the background brightness and of the gradation of an electro-optical reproducing device, particularly in a television receiver, to which a signal voltage U of the characteristic indicated, so that with a given, stationary ambient brightness $H_{ro}$, particularly in dark surroundings, an exponential brightness characteristic curve (brightness ladder) with a given background brightness $H_o$ and a given peak brightness $H_n$ is obtained, so that even in the event of a higher background brightness a characteristic curve is obtained which is adapted to the sensitivity of the eye and hence a substantially natural reproduction, if, in accordance with the invention, with a varied background brightness $H'_o$ and a peak brightness $H'_n$, which may have changed, the signal voltage U is converted via a deformation stage controlled in accordance with the background brightness, into a corrected signal voltage to be supplied to the reproducing device, in a manner such that always an at least substantially exponential brightness characteristic curve is obtained.

The required characteristic curve of the deformation stage is obtained in a simple manner by calculating, for example the values of the background brightness $H''_o$ and of the peak brightness $H''_n$, produced for example by an additional direct voltage $U_v$, and by connecting these values in the diagram shown in FIG. 1 to each other by a straight line 5. Then, as indicated hereinbefore for the construction of the curve 1″, an abscissa value *x* is chosen; then proceeding from the added value to the curve 5 horizontally up to curve 1, a voltage value is found perpendicularly below it on the curve 2, this value being added to the chosen step *x*. Then curve 6 is obtained. If the relationship according to Formula 3 between the brightness H and the control-voltage $U_s$ is accurately maintained, the curve 6 is also a straight line, having the starting value $U''_{so}$ and a final value $U''_{sn}$.

For comparison the uncorrected control-voltage curve 6′ associated with curve 1″ is indicated, which curve is obtained from curve 2 by the addition of the shifting voltage $U_v$ of about 4.5 v. It is evident that the curve 6, especially in the central portions, has higher values than the curve 6′ obtained by single addition of the signal voltage U and the constant shifting voltage $U_v$.

Figure 3:
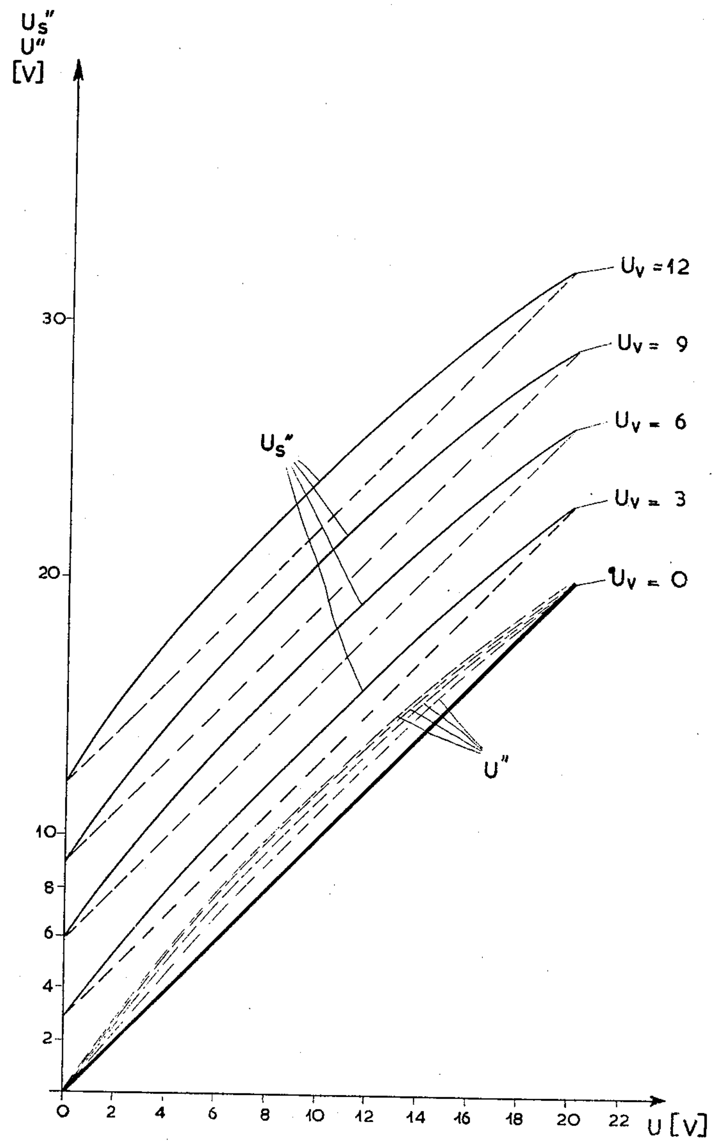
FIG. 3 illustrates a corrected signal control voltage.

The signal voltage U or the sum thereof with the shifting voltage $U_v$ must therefore be increased by the deformation stage at the average values. For further explanation FIG. 3 shows the corrected control-voltage $U''_s$ in accordance with the signal voltage U at different values of the shifting voltage $U_v$. The deformation must indeed be largest in the case of low voltages (low brightness).

The curve 6 may be mathematically expressed by replacing in Formula 4 U, $U_v$ and $U_n$ by $U''+U_v$, $U_o+U_v$ and $U_n+U_v$ respectively. Then:

$$U''_s=U''+U_v=(U_o+U_v)\left(\frac{U_n+U_v}{U_o+U_v}\right)^{\frac{x}{n}} \quad (10)$$

is obtained. If between H and U the relationship according to Formulae 2, 3 and 4 exists, from Formula 4 it may be calculated that $x/n$:

$$x/n=\frac{\ln U/U_o}{\ln U_n/U_o} \quad (11)$$

If Formula 11 is introduced into Formula 10, U'' is obtained as a function of U. Owing to the identity:

$$a^{\ln b}=b^{\ln a} \quad (12)$$

the anti-logarithm of the logarithm in the numerator of Formula 11 can be exchanged for the basis of the exponential expression in (10), after which:

$$U''_s=U''+U_v(U_o+U_v)\left(\frac{U}{U_o}\right)^{\left(\frac{\ln\frac{U_n+U_v}{U_o+U_v}}{\ln U_n/U_o}\right)} \quad (13)$$

With a constant shifting voltage $U_v$, which is used in FIG. 2 as a parameter, the exponent is also constant.

As an alternative, the signal voltage U alone may be corrected and the shifting voltage $U_v$ may be added separately; this is advantageous, if the control-voltage part U'' varying with the signal voltage is to be applied to one electrode, for example to the cathode, and the shifting voltage $U_v$ to a different electrode, for example to the grid (Wehnelt cylinder) of a cathode-ray tube.

The corrected control-voltages required to this end have the characteristic curve 2'' of FIG. 1 and the broken-line curves of FIG. 3 for different values of $U_v$.

By calculating:

$$U''=(U_o+U_v)\cdot\left(\frac{U_n+U_v}{U_o+U_v}\right)^{\frac{x}{n}}-U_v \quad (10')$$

is obtained. $x/n$ (according to Formula 11) may be converted and, whilst considering Formula 12, $$U''=(U_o+U_v)\left(\frac{U}{U_o}\right)^{\left(\frac{\ln\frac{U_n+U_v}{U_o+U_v}}{\ln U_n/U_o}\right)}-U_v \quad (13')$$

is obtained.

In order to stress further the deformation, the corrected signal voltage U'' may be brought into relationship with the uncorrected signal voltage, so that the correction function $U''/U$ is obtained. It follows therefrom that with $U_{vmax}=12$ v. and the signal voltage of the diagram=from 2 to 20 v. and a low brightness value, a deformation up to 1.35 times is required.

In order to acquire a correction when an additional brightness value occurs, produced on the screen by alien light, this ambient brightness $H_r$ must be converted into an adjusting value and thus be measured. This may be carried out in known manner by means of a photo-electric cell, of which the output signal acts upon a preferably electronic correction amplifier.

With a television receiver it is, however, simpler to utilize the screen picture itself as a kind of photometer. To this end the background brightness $H''_o$ is adjusted in a manner such that in the dark image portions the lines of the raster can still be distinguished from their darker intermediate spaces.

The brightness of the intermediate spaces is then determined by the ambient brightness $H_r$ and the aforesaid stray-light brightness $H_{oo}$. The brightness of the lines is determined on the one hand by the natural brightness of the electron beam $H'''_o$ and on the other hand also by the ambient light $H_r$ reflected within the range of the lines and by the stray light $H_{oo}$; the spectator gets the impression of an addition of these partial values, so that the total brightness H* of the lines for the black value (background brightness value) $H_o$* is given by the sum $$H_o^*=H'''_o+H_r+H_{oo} \quad (14)$$

(The symbol * (asterisk) is employed in this disclosure to denote a superscript, in the same manner as prime marks.)

The lines and the intermediate spaces can then be distinguished, where their intensity ratio approaches approximately a given threshold value $k$*:

$$\frac{H'''_o+H_r+H_{oo}}{H_r+H_{oo}}=k^* \quad (15)$$

From experiments it has been found that with ambient brightness values $H_r$ on the screen of the order of about 3 to 30 asb., usually occurring in practice and particularly with the tranmsission of an image having a materially higher mean image brightness, the lines and the intermediate spaces can be just distinguished, when $$k^*=2,\ H'''=H_r+H_o \text{ respectively} \quad (16)$$

It is assumed herein that:

$$H_{oo}=H_o \quad (17)$$

This assumption is reasonable, since the two values are of the same order of magnitude and, with a considerable ambient brightness, are indeed comparatively low. On the other hand, with a low ambient brightness, the required correction is accordingly smaller, so that any error provoked by this assumption is not a source of trouble. Since $H_o$ is known without difficulty, the Formula 17 simplifies the calculation.

This provides the possibility, by the adjustment of the background brightness $H'''_o$, to measure the ambient brightness $H_r$.

The correction must then be carried out in a manner such that a linear brightness characteristic curve is obtained between the limit values:

$$H_o^*=H'''_o+H_r+H_o=2(H_r+H_o)-H'''_o \quad (18a)$$

and $$H_n^*=H_n+H_r+H_o=H_n+H'''_o \quad (18b)$$

It must then be true that $$H'''+H_r+H_o=H^*=2(H_r+H_o)\left(\frac{H'''_n+H_r+H_o}{2(H_r+H_o)}\right)^{\frac{x}{n}} \quad (19)$$

wherein $H'''_n$ is not yet determined.

If the background brightness $H_o$ is raised by a shifting voltage $U_v$* to $H'''_o=H_r+H_o$, from the diagram of FIG. 1 the shifting voltage $U_v$* associated with a given $H_r$-value can be readily derived, so that also $H'''_n$ can be determined. (It should be noted that in this case $H'''_o=H_o$ and $H'''_n=H''_n$ (cf. 8 and 9).)

Thus also the limit values of the Equation 19 are determined (compare also 18*a* and 18*b*) and by means of a straight line connecting these values the associated characteristic curve 7 is obtained for H*.

According to the Formulae 14 to 17, from the Formula 19 (curve 7) is obtained the equation for the natural brightness H' (curve 7') to be obtained by subtracting the ambient light and the stray light and, if $H_r+H_o$ is replaced, by the adjusted value $H'''_o$:

$$H'''=H^*-H'''_o=2H'''_o\left(\frac{H'''_n+H'''_o}{2H'''_o}\right)^{\frac{x}{n}}-H'''_o \quad (20)$$

By means of the known control-curves 1 and 2 of the reproducing device $H=f(U_s)$ cf. Formulae 2, 3 and 4, the required, corrected control-voltage $U'_s$ is obtained.

Considering the Equation 3, a formula is obtained, which contains only voltage values:

$$(U+U_v^*)^\gamma=2(U_o+U_v^*)^\gamma\frac{(U_n+U_v^*)^\gamma+(U_o+U_v^*)}{2(U_o+U_v^*)^\gamma}^{\gamma\frac{x}{n}}-(U_o+U_v)^\gamma \quad (21)$$

According to Formula 11, and as the case may be, to Formula 12, in Formulae 20 and 21 $x/n$ may, if desired, be recalculated. From Formula 21 can, of course, be readily calculated $U^*$, the corrected control-voltage minus $U_v$, and hence the corrected signal voltage. With the above considerations the peak brightness was increased little, at least not on purpose. However, since otherwise, the background brightness $H_o$ varies strongly, the contrast decreases materially (cf. Formula 1*b*). Then only a smaller number of brightness steps can be reproduced, so that the quality of a transmitted picture or the like is yet slightly detracted from in spite of the correction of the characteristic.

According to the invention also this disadvantage can be avoided, if the peak brightness is varied with the background brightness in a manner such that the contrast, at least within a given range, remains at least substantially constant or decreases only little respectively. This may be achieved, for instance, in that the background brightness $H_o^{*\prime}$ is not obtained in the first place by the shifting voltage $U_v$, but particularly by the increase in amplitude of the variable part of the control-voltage $U_s$ (or of the signal voltage U respectively).

When the background brightness $H_o^*$ is to be varied in dark surroundings, the control-voltage $U_s^{*\prime}$ must have the form:

$$U_s^{*\prime}=c.U \quad (22)$$

The adjustment of the background brightness then takes place by the adjustment of the factor *c*. Consequently, the contrast is constant:

$$K=\frac{cU_n}{cU_o}=\frac{U_n}{U_o} \quad (23)$$

In this case a non-linear characteristic curve deformation is not required. It should, however, be considered that the signal voltage U does not represent simply the voltage supplied for example by a video demodulator, but that the Equation 3 must be fulfilled: the voltage U must be calculated from the peak of the control-characteristic curve (parabola) of the reproducing device (cf. FIG. 2). It may be required, in this case, to add or to subtract a constant voltage before the control which varies the constant *c*, for example a potentiometer.

If also the ambient brightness is to be taken into consideration, the control-voltage becomes $$U''^*_s=c'U+U''^*_v \quad (24)$$

Then again a virtual deformation of the control-characteristic curve must take place. The required characteristic curve may be readily drawn in a diagram as shown in FIG. 1.

According to Formulae 14 to 17, first the background brightness is determined at an ambient brightness $H_r$:

$$H^{*\prime\prime}_o=H''''_o+H_r+H_o=2H''''_o \quad (25)$$

From this point a straight line 8 is drawn parallel to curve 1, so that the peak brightness is found:

$$H^{*\prime\prime}_n=H''''_n+H_r+H_o=H''''_n+H''''_o \quad (26)$$

From the values of the straight line 7 $H''''_o$ must be subtracted, so that the curve 8′ is obtained for H''''. Then, as described above, the required control-voltage $U^{*\prime\prime}_s$ can be determined with the aid of the control-characteristic curves according to (1) and (2).

Particularly from the limit values: $U^{*\prime\prime}_{so}$ and $U^{*\prime\prime}_{sn}$ the values *c′* and $U_v$ can be readily calculated. It should be noted that $U_v$ becomes smaller with higher background brightness values, whilst *c* increases.

However, cathode-ray tubes do not permit an arbitrary increase in peak brightness, since on the one hand the phosphorescent substance exhibits saturation phenomena and on the other hand the high-voltage supply source has a comparatively high internal resistance, so that with an increase in load the voltage can decrease strongly, at any rate owing to a high mean image brightness, so that the desired increase in brightness is counteracted. It may therefore be advantageous to maintain the contrast constant only at the beginning of the control-range and, after a definite limit has been attained, for example at twice or thrice the value of the initial value, to no longer increase materially the peak brightness. The increase in peak brightness may, as an alternative, be distributed throughout the control-range of the background brightness in a manner such that the peak brightness increases approximately uniformly, so that the ratio factor is lower than 1. Then a contrast diminution cannot be avoided, it is true, but this reduction is not large.

For the sake of completeness it should be expressly noted that the correct reproduction of a brightness ladder (exponential luminous density, or brightness distribution respectively) guarantees at the same time an image reproduction in accordance with the correct gray values.

The invention will now be described more fully with reference to two embodiments.

Figure 4:
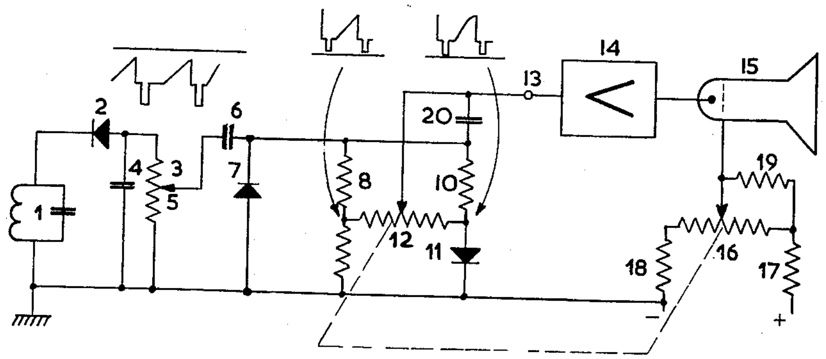
FIG. 4 illustrates a circuit arrangement in accordance with the invention for providing the desired corrected signal control voltage for the reproducing device.

According to FIG. 4 the television signals modulated in known manner on a carrier are supplied to an oscillatory circuit 1, preferably via a medium-frequency amplifier, the said circuit being connected on one side to earth. The oscillations are obtained from the other terminal of the circuit and supplied to the cathode of a diode 2, the anode of which is connected to earth via a load resistor 3 of, for example, 3K ohm and a parallel-connected smoothing capacitor 4. The demodulated video signal occurs in known manner across the resistor 3. For the adjustment of the contrast, i.e. of the amplitude $U_n$ of the video signal obtained, with a constant black value $U_o$, the resistor 3 is constructed in the form of a potentiometer, from which the signal voltage is derived at the sliding contact 5. The detected signal voltage, which is obtained from the sliding contact 5, is, in accordance with the formulae developed hereinbefore and to derive the desired corrected signal voltage U″ which is fed to the cathode of the reproducing tube 15, assumed to be 2U. By means of a separation capacitor 6 of, for example, 1 μf and a black-level control-diode 7, which are connected in series between the sliding contact 5 and earth, the video signal at the junction of the capacitor 6 and the diode 7 is brought to earth potential with the negative peak value (peaks of the synchronizing pulses). The diode 7 is conducted in parallel with the series combination of two, preferably identical resistors 8 and 9 of, for example, 4K ohm each. Consequently, at their junction occurs the video voltage with half the amplitude. The diode 7 is furthermore connected in parallel with a voltage-dependent potentiometer consisting of the resistor 10, of for example, 750 ohm, and the diode 11, for example type OA81; the diode 11 is connected to earth via its cathode.

At the junction of the resistor 10 and the diode 11 a video signal occurs, which, at an increase in voltage (i.e. at the white signals) is reduced to more than half. The characteristic curve of this signal therefore exhibits a curvature, which is indicated in broken lines in FIG. 3 for the maximum value of $U_v$. Between the junctions of the resistors 8 and 9 and of the resistor 10 with the diode 11 is connected a potentiometer 12, the resistance value of which is high, for example 50K ohm, as compared with the said resistors.

When the sliding contact of the potentiometer 12 is at the junction of the resistors 8 and 9, the output terminal thereof has produced at it the original video voltage U, the waveform of which has not changed. If the sliding contact is at the junction of the resistor 10 and the diode 11, the corrected control-voltage curve for a maximum shifting voltage $U_v$ is obtained, as is indicated. Since, as is evident from FIG. 3, the characteristic curves for intermediate values of the shifting voltage are substantially equal to the characteristic curve at a maximum shifting voltage, the sliding contact of the potentiometer 12 permits of adjusting substantially any desired deformation for arbitrary shifting voltages. However, this correction is not accurate at all points. Compared with a non-corrected characteristic curve, however, a marked improvement is obtained, so that a deviation from the optimum value is unimportant.

The signal corrected in this deformation arrangement is supplied as a control-voltage $U_s$ from the output terminal 13 to a reproducing device, which comprises an amplifier 14 and a cathode-controlled cathode-ray tube 15. The synchronizing pulse, which is often derived after the amplifier 14 and which is therefore not distorted, is not materially deformed in the arrangement described.

The arrangement so far described supplies only the corrected signal according to the broken-line curve of FIG. 3. The required shifting voltage $U_v$ is supplied to the control-grid or the Wehnelt cylinder respectively of the cathode-ray tube 15 from the sliding contact of the potentiometer 16, which is connected via series resistors 17 and 18 to the positive or the earth-connected negative terminal respectively of a supply source of for example 250 v.

Since the variations in a gradation (curvature of the characteristic) and of the background brightness (shifting voltage $U_v$) must take place simultaneously, the control-members, for example the shafts of the potentiometers 12 and 16, are intercoupled mechanically.

Since the deformation curves (see FIG. 3) approach the curve of the maximum value of $U_v$, equally but not proportionally to $U_v$, the potentiometers 12 and 16 must not have identical, particularly identical linear characteristic curves. It has been found that with a shift of the sliding contact of the gradation potentiometer 12 from left to right (from the linear characteristic to the maximum deformation characteristic) the voltage $U_v$ must increase first slowly and then more rapidly. This may be achieved in a simple manner by connecting in parallel with the potentiometer 16 between the sliding contact and the positive terminal a resistor 19, which has preferably the same value as the resistor 16.

In the control-circuit for $U_v$ (potentiometer 16), which conveys only direct current, may be included further correction members, for example a voltage-dependent (VDR) resistor or a current-dependent resistor with negative temperature coefficient (NTC-resistor), so that the desired dependence of the shifting voltage $U_v$ upon an adjusting value can be obtained without the need for further means.

It is known that a gradation correction is required in the first place with low video frequencies, i.e. for larger picture surfaces, but not to a great extent in the fine details, i.e. with high frequencies. Since, on the other hand, the deformation circuit, owing to its stray capacity, detracts from the higher frequencies, it may be advantageous not to convey the high frequencies via the deformation stage. To this end a capacitor 20 of, for example 60 pf. may be included between the supply point of a tapping of the linear potentiometer 8, 9 and the output terminal 13.

It is required to maintain the black level of the signal voltage satisfactorily constant in order to obtain a fixed relationship between the optical background brightness and the electrical gradation correction. The simple black-level control-circuit operating by means of the diode 7 may therefore be efficaciously replaced by an arrangement, in which not the peaks of the synchronizing pulses but the black values themselves, particularly the output values required in accordance with Formula 3 are stabilized. As an alternative, known black-level gating arrangements may be employed with advantage.

Figure 6:
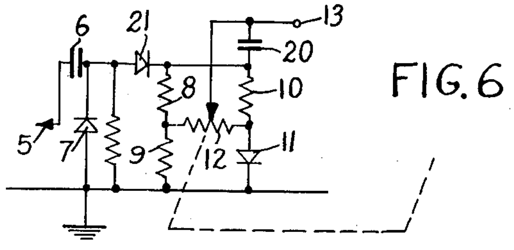
FIGS. 5 and 6 are circuit diagrams illustrating modifications of portions of the circuit of FIG. 4.

It may be advantageous to suppress the synchronizing pulses from the signal to be deformed. As shown in FIG. 6, this may be done by including a series-connected diode 21 between the coupling capacitor 6 and the linear potentiometer 8, 9. A load resistor 22 is connected in parallel with the black-level control-diode 7.

When smoothing at least one of the resistors 8, 9 or 10 it should be considered that the voltage peak value for the background brightness $H_0$ and the peak brightness $H_n$ in both final positions of the sliding contact 12 are at least substantially equal.

The characteristic can be adjusted in a simple manner by supplying the corrected signal to an oscillograph, in which a corresponding pattern is provided. Of course, the characteristic may be varied within a large range, particularly by supplying a constant bias voltage or a bias voltage varying with $U_v$ (control 16) to the branch of the diode 11 or by means of a resistor connected in parallel with the diode 11.

A correction, if desired, of the frequency- and/or phase-characteristic curve is preferably carried out in the output circuit of the amplifier 14, for example in the anode circuit of a video output pentode.

The deformation stage itself may be included in the output circuit of the amplifier. When using a tube amplifier, the deformation in the grid circuit is advantageous, since the local impedances are low, so that any stray capacities are less troublesome.

Figure 5:
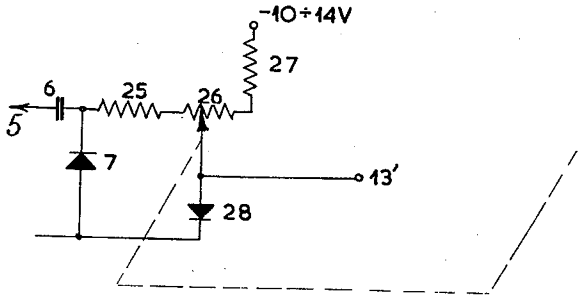

FIG. 5 shows a circuit arrangement which is similar to the arrangement shown in FIG. 4 up to and including the capacitor 6 and the diode 7. In this case, the deformation stage connected to the junction of these two circuit elements consists, however, of the series combination of three resistors 25, 26 and 27 of, for example, 6, 5 and 25K ohm and the negative terminal of an auxiliary-voltage source of, for example, 10 to 14 v., the other terminal of which is connected to earth.

The resistor 26 is a potentiometer, the sliding contact of which is connected to the anode of a crystal diode 28, (for example type OA70), which is otherwise connected to earth. To the sliding contact 26 is connected the output electrode 13'.

The resistors 25 and 26 and the diode 28 constitute again a voltage-dependent potentiometer, the working point of which is adjusted by a variation of the bias voltage in the diode circuit by means of the sliding contact of the potentiometer 26. Simultaneously the voltage ratio varies, so that the voltage loss is compensated, which is produced by the reduction of the internal resistance of the diode. If the control-grid of a tube or the like is connected to the output terminal 13', a separation capacitor must be included in order to avoid that the variable direct voltage occurring across the diode 28 interferes with the working point of the subsequent amplifier.

As compared with that of FIG. 4, the arrangement of FIG. 5 comprises materially fewer circuit elements, so that the high frequencies are substantially not affected adversely. Therefore, the capacitor shunting the high-frequency rectifier may be omitted.

As an alternative, instead of using two potentiometers 12 and 16, use may be made of a single potentiometer, so that a mechanical coupling may be dispensed with. To this end, as is shown in FIG. 5, the variation of the characteristic curve is brought about by a variation in the bias voltage of a nonlinear element, for example of a diode, the bias voltage being obtainable from the brightness control, which supplies the variable shifting voltage. If the bias voltage and the shifting voltage must have different characteristic curves, the required corrections may be obtained by including further voltage- or current-dependent elements. Since these direct-current circuits do not convey the signal voltage, no trouble will be caused by stray capacities and the like.

When the idea of the invention is properly carried out, the right correction may even be obtained, when the relationship between the control-voltage $U_s$ and the brightness H of the reproducing tube deviates from the law given by Formula 3. From the diagram shown in FIG. 1 the required characteristic curves as described above may be readily found, when the varied relationship between the control-voltage $U_s$ and the auxiliary variable $x$ is taken into consideration.

What is claimed is:

1. A circuit arrangement for the control of background brightness and gamma of an electro-optical reproducing device, comprising input means for an image signal having intensity variations determining variations in brightness of light elements of an image to be reproduced, means for producing a second image signal having intensity variations non-linearly proportional to the intensity variations of said first signal, means for adjusting the intensity of said second signal, means for adjusting the background brightness of said reproducing device and means for simultaneously actuating said image signal adjusting means and said background brightness adjusting means to effect the simultaneous control of background brightness and gamma correction of signals applied to said reproducing device.

2. A circuit arrangement as claimed in claim 1 wherein said second image signal producing means comprises first and second resistors connected in series circuit arrangement, a third resistor and a voltage responsive non-linear element connected in series circuit arrangement, means connecting said two series circuit arrangements in parallel circuit arrangement, means for applying said first image signal to said parallel circuit arrangement, and an impedance having an adjustable tapping having its end connected to the junction of said first and second resistors and the junction of said third resistor and said non-linear element respectively, and means obtaining said second image signal from said tapping.

3. A circuit arrangement as claimed in claim 1 wherein said second image signal producing means comprises a resistor network comprising first, second and third resistor elements connected in series relationship in that order, said second resistor element being provided with a variable tapping, a voltage responsive non-linear impedance interconnecting said tapping and a point of reference potential, means for applying said first image signal to the free end of said first resistor element, means for applying a variable potential to the free end of said third resistance element thereby to vary the impedance of said non-linear element, and means for deriving said second image signal from the said tapping.

4. A circuit arrangement as claimed in claim 3 wherein said means for adjusting the background brightness of said reproducing device comprises means for varying the potential applied to said third resistance element.

5. A circuit for the control of background brightness and gamma of an electro-optical reproducing device, comprising a source of first image signals having intensity variations determining variations in brightness of light elements of an image to be reproduced, means connected to said source for producing a second image signal having intensity variations non-linearly proportional to the intensity variations of said first signal, adjustable means for combining said first and second image signals in variable proportion to provide an output signal, means applying said output signal to said reproducing device, means for adjusting the background brightness of said reproducing device, and means for simultaneously adjusting said adjustable combining means and brightness adjusting means to effect the simultaneous control of background brightness and gamma correction of signals applied to said reproducing device.

6. A circuit for the control of background brightness and gamma of an electro-optical reproducing device, comprising a source of first image signals having intensity variations determining variations in brightness of light elements of an image to be reproduced, a first series circuit comprising first and second resistors, a second series circuit comprising a third resistor and a non-linear element, means connecting said series circuits in a parallel circuit, means connecting said source serially with said parallel circuit, a potentiometer having one end connected to the junction of said first and second resistors, the other end connected to the junction of said third resistor and said non-linear element, and a variable tap, means connecting said variable tap to said reproducing device, means for adjusting the background brightness of said reproducing device, and means for simultaneously adjusting said variable tap and said brightness adjusting means to effect the simultaneous control of background brightness and gamma correction of signals applied to said reproducing device.

References Cited in the file of this patent

UNITED STATES PATENTS

| | | |
|---|---|---|
| 2,204,992 | Holmes | June 18, 1940 |
| 2,264,172 | Batchelor | June 25, 1941 |
| 2,269,570 | Wilson | Jan. 13, 1942 |
| 2,269,590 | Lewis | Jan. 13, 1942 |
| 2,668,188 | Naslund | Feb. 2, 1954 |
| 2,804,498 | Theile | Aug. 27, 1957 |
| 2,942,064 | Boochs | June 21, 1960 |

FOREIGN PATENTS

| | | |
|---|---|---|
| 702,321 | Great Britain | Jan. 13, 1954 |
| 702,325 | Great Britain | Jan. 13, 1954 |
| 709,715 | Great Britain | June 2, 1954 |